United States Patent
Kurian

(10) Patent No.: US 11,165,886 B2
(45) Date of Patent: Nov. 2, 2021

(54) MULTI-DISTRIBUTION RESOURCE ALLOCATION SYSTEM

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/733,563

(22) Filed: Jan. 3, 2020

(65) Prior Publication Data
US 2021/0211519 A1    Jul. 8, 2021

(51) Int. Cl.
*H04L 29/08*    (2006.01)
*G06Q 20/16*    (2012.01)
*G06F 16/16*    (2019.01)

(52) U.S. Cl.
CPC ............ *H04L 67/327* (2013.01); *G06F 16/16* (2019.01); *G06Q 20/16* (2013.01); *H04L 67/06* (2013.01); *H04L 67/28* (2013.01)

(58) Field of Classification Search
CPC ....... H04L 67/327; H04L 67/06; H04L 67/28; H04L 67/32; G06Q 20/16; G06F 16/16
See application file for complete search history.

(56) References Cited

U.S. PATENT DOCUMENTS

| | | | |
|---|---|---|---|
| 6,938,075 B1 * | 8/2005 | Abbott | H04L 29/06 709/218 |
| 6,956,867 B1 * | 10/2005 | Suga | H04L 29/06027 370/465 |
| 7,653,596 B2 | 1/2010 | Crane et al. | |
| 7,827,101 B2 | 11/2010 | Mascavage, III | |
| 8,285,641 B2 | 10/2012 | Cataline et al. | |
| 9,613,358 B1 | 4/2017 | Gardner | |
| 2009/0022881 A1 | 1/2009 | Tsai et al. | |
| 2010/0063924 A1 | 3/2010 | Hougland et al. | |
| 2016/0314451 A1 | 10/2016 | Martin | |
| 2018/0150821 A1 | 5/2018 | Wieler et al. | |
| 2018/0167439 A1 * | 6/2018 | Huang | H04L 67/1097 |
| 2018/0205781 A1 * | 7/2018 | Vezzuto | H04L 12/185 |
| 2018/0240094 A1 | 8/2018 | Perez et al. | |
| 2018/0288154 A1 * | 10/2018 | Ghazaleh | G06F 16/182 |
| 2018/0374073 A1 | 12/2018 | Zhao | |

* cited by examiner

*Primary Examiner* — Ario Etienne
*Assistant Examiner* — Kamal Hossain
(74) *Attorney, Agent, or Firm* — Michael A. Springs; Moore & Van Allen PLLC; James C. Edwards

(57) ABSTRACT

A system that provides for implementing a communication network with multiple data routers capable of segmenting a data file, such that the data routers provide for multi-distribution of different segments of a data file to different targets. As a result, a source is able to communicate a data file, segments of which are designated for multiple targets and have the actual segmentation of the data file occur after the data file has been transmitted (i.e., during the routing process).

13 Claims, 6 Drawing Sheets

MULTI-DISTRIBUTION RESOURCE ALLOCATION SYSTEM

FIELD OF THE INVENTION

The present invention is generally related to electronic communication of data and, more specifically, implementing a communication network with multiple data routers, such that the data routers provide for multi-distribution of different segments of a data file to different targets.

BACKGROUND

Typically, data files are electronically communicated in their entirety, from one point (i.e., a source location) to a second point (i.e., a target location). In the event that the data file is required to be segmented with each segment of the data file intended for different targets, such segmentation occurs prior to communicating the segments of the data file (i.e., at the source location). In this regard, each of the segments of the data file act as a separate file, which is electronically communicated from one point (i.e., the source location) to a second location (i.e., a target location).

However, in certain instances it may be desirable to perform the segmentation of the data file after the data file has been electronically communicated, i.e., during the routing process. For example, in certain instances the source/sender may be unaware at the time of data file communication as to how the segmentation is to occur (e.g., which targets receive which data in the data file and/or the amount of data in the data file). In addition, other benefits may be realized by segmenting the data file after the data file has been electronically communicated.

Therefore, a need exists to develop systems, methods, computer program products and the like that provide for segmentation of a data file during the routing process of an electronic communication. In this regard, the desired systems, methods, computer program products and the like should provide for a source to communicate a data file, segments of which are designated for multiple targets and for the actual segmentation of the data file to occur after the data file has been transmitted (i.e., during the routing process). Further, the desired systems, methods, computer program products and the like should provide for segmentation decisions, such as how the data file is to be segmented, to occur during the routing. Moreover, since segmentation during routing is desired, the systems, methods, computer program products and the like should additionally provide for means to add or delete controls during segmentation and provide for tracking lineage, usage and other factors to ensure security in the segmentation and delivery process.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for downstream segmentation of a data file during the transmission/routing process of an electronic communication. As a result, a source is able to communicate a data file, segments of which are designated for multiple targets and have the actual segmentation of the data file occur after the data file has been transmitted (i.e., during the routing process). This means that efficiencies and cost-savings can be realized by the source/sender in only having to communicate a single data file. Additionally, in specific embodiments of the invention, Artificial Intelligence (AI) including, in some embodiments, Machine Learning (ML) techniques are implemented at the router-level to provide for smart segmentation decisioning to be made during the routing process, i.e., determining which portions/amounts of the data file should be segmented for each of the multiple targets, which controls should be added or removed from the data file and/or segments and the like.

In specific embodiments of the invention, the data file is segmented into multiple threads with each thread designated for one of the multiple targets. Each thread includes a data heuristics tag that initially identifies the data file and the desired target. The data heuristics tag is separately communicated to the desired target, such that the tag acts a key providing the target access to the data file segment once the segment has been received by the desired target. Additionally, the data heuristics tag includes logic which allows for identification of each node in the communication path of the data file and/or data file segments, such that data heuristic tag provides the ability to track the lineage (i.e., the routing of the data file and the segment) and the usage (i.e., receipt by the desired target).

A system for multi-distribution of segments of a data file defines first embodiments of the invention. The system includes a data file comprising a plurality of data units. The data file is configured for segments of the data file to be communicated to different target. The system additionally includes a plurality of routers disposed with a distributed communication network. Each router includes a computing platform having a memory, at least one processor in communication with the router, and instructions stored in the memory. The instructions are executable by the least one processor and configured to receive at least a portion of the data file and determine that the at least a portion of the data file is required to be segmented, at the router, into a plurality of data file threads. The instructions are further configured to determine an amount of the data units to include in each of the plurality of data file threads and segment the at least a portion of the data file into the plurality of data file threads comprising the determined amount of data units. In addition, the instructions are configured to define a communication channel for each of the plurality of data file threads, and initiate communication of each of the plurality of data file threads on the corresponding communication channel to a corresponding one of the different targets.

In specific embodiments of the system, the instructions are further configured to generate, and attach to each of the plurality of data file threads, a data heuristics tag that includes at least one identifier configured to identify (i) the data file, (ii) the router, (iii) a target, and (iv) each node in a communication path that the at least a portion of the data file has encountered prior to be received by the router. In related embodiments of the system, the data heuristics tag includes logic that is configured to (i) generate one or more additional identifiers or add to the at least identifier to identity each subsequent node in the communication path that the at least a portion of the data file encounters after being received at the router, and/or (ii) confirm at least one of receipt of the data file segment at a corresponding target and usage of the data units upon receipt at the corresponding target. In other related embodiments of the system, the instructions are further configured to communicate the data heuristics tag to a target of the data file segment. The target, upon receipt of the data file segment at the corresponding targets, uses the data heuristic tag to at least one of (i) access the data units in the data file segment, and (ii) use the data units in the data file segment.

In still further specific embodiments of the system, the instructions are further configured to determine that the at least a portion of the data file is required to be segmented, at the router, into a plurality of data file threads based on a next node in the communication path of the at least a portion of the data file being different for at least two of the targets.

In other specific embodiments of the system, the instructions are further configured to determine the amount of the data units based at least one of (i) data units currently required at each of the targets, (ii) time requirements for delivering data units to each of the targets, (iii) current capacity of each of the targets for processing the data units, and (iv) a network or geo-location of each of the targets.

In further specific embodiments of the system, the instructions are further configured to determine, and apply to each of the data file threads, one or more controls based on one or more of (i) a network or geo-location of the router, (ii) type of data units in the data file segment, and (iii) usage of the data units at the target. In related embodiments of the system, the instructions are further configured to determine, and apply to the data heuristics tag attached each of the data file threads, the one or more controls. In other related embodiments of the system, the instructions are further configured determine, and remove from each of the data file threads, one or more previously applied controls based at least on a difference between (i) the network or geo-location of the router, and (ii) a network or geo-location at which the one or more previously applied controls were applied.

A computer-implemented method for multi-distribution of segments of a data file define second embodiments of the invention. The method is executed by one or more computing processor devices. The method includes receiving, at a router, at least a portion of a data file that includes a plurality of data units. The data file is configured such that segments of the data file are to be communicated to different targets. The method further includes determining that the at least a portion of the data file is required to be segmented, at the router, into a plurality of data file threads, The method further includes determining an amount of the data units to include in each of the plurality of data file threads and segmenting the at least a portion of the data file into the plurality of data file threads in the determined amount of data units. Moreover, the method includes defining a communication channel for each of the plurality of data file threads and initiating communication of each of the plurality of data file threads on the corresponding communication channel to a corresponding one of the different targets.

In specific embodiments the computer-implemented method further includes generating, and attaching to each of the plurality of data file threads, a data heuristics tag that includes at least one identifier configured to identify (i) the data file, (ii) the router, (iii) a target, and (iv) each node in a communication path that the at least a portion of the data file has encountered prior to be received by the router. In related embodiments of the computer-implemented method, generating the data heuristics tag further includes providing logic in the tag that is configured to perform at least one (i) generating one or more additional identifiers or add to the at least identifier to identity each subsequent node in the communication path that the at least a portion of the data file encounters after being received at the router, and (ii) confirming at least one of receipt of the data file segment at a corresponding target and usage of the data units upon receipt at the corresponding target. In still further related embodiments the computer-implemented method further includes communicating the data heuristics tag to a target of the data file segment, wherein the target, upon receipt of the data file segment at the corresponding targets, uses the data heuristic tag to at least one of (i) access the data units in the data file segment, and (ii) use the data units in the data file segment.

In still further specific embodiments of the computer-implemented method, determining that the at least a portion of the data file is required to be segmented, at the router, into the plurality of data file threads further includes making the determination based on a next node in the communication path of the at least a portion of the data file being different for at least two of the targets.

In additional specific embodiments of the computer-implemented method, determining the amount of the data units further includes determining the amount of the data units based at least one of (i) data units currently required at each of the targets, (ii) time requirements for delivering data units to each of the targets, (iii) current capacity of each of the targets for processing the data units, and (iv) network or geo-location of each of the targets.

A computer program product including a non-transitory computer-readable medium defines third embodiments of the invention. The computer readable medium includes a first set of codes for causing a computer to receive, at a router, at least a portion of a data file including a plurality of data units. The data file is configured for segments of the data file to be communicated to different target. The computer-readable medium additionally includes a second set of codes for causing a computer to determine that the at least a portion of the data file is required to be segmented, at the router, into a plurality of data file threads. In addition, the computer-readable medium includes a third set of codes for causing a computer to determine an amount of the data units to include in each of the plurality of data file threads and a fourth set of codes for causing a computer to segment the at least a portion of the data file into the plurality of data file threads, each of the plurality of data file threads comprising the determined amount of data units. Moreover, the computer-readable medium includes a fifth set of codes for causing a computer to define a communication channel for each of the plurality of data file threads, and a sixth set of codes for causing a computer to initiate communication of each of the plurality of data file threads on the corresponding communication channel to a corresponding one of the different targets.

In specific embodiments of the computer program product, the computer-readable medium additionally includes a seventh set of codes for causing a computer to generate, and attach to each of the plurality of data file threads, a data heuristics tag that includes at least one identifier configured to identify (i) the data file, (ii) the router, (iii) a target, and (iv) each node in a communication path that the at least a portion of the data file has encountered prior to be received by the router.

In other specific embodiments of the computer program product, the second set of codes is further configured to determine that the at least a portion of the data file is required to be segmented, at the router, into the plurality of data file threads further comprises making the determination based on a next node in the communication path of the at least a portion of the data file being different for at least two of the targets.

In still further specific embodiments of the computer program product, the third set of codes is further configured to cause the computer to determine the amount of the data units based at least one of (i) data units currently required at each of the targets, (ii) time requirements for delivering data units to each of the targets, (iii) current capacity of each of the targets for processing the data units, and (iv) network or geo-location of each of the targets.

Thus, according to embodiments of the invention, which will be discussed in greater detail below, the present invention provides for implementing a communication network with multiple data routers capable of segmenting a data file, such that the data routers provide for multi-distribution of different segments of a data file to different targets. As a result, a source is able to communicate a data file, segments of which are designated for multiple targets and have the actual segmentation of the data file occur after the data file has been transmitted (i.e., during the routing process).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
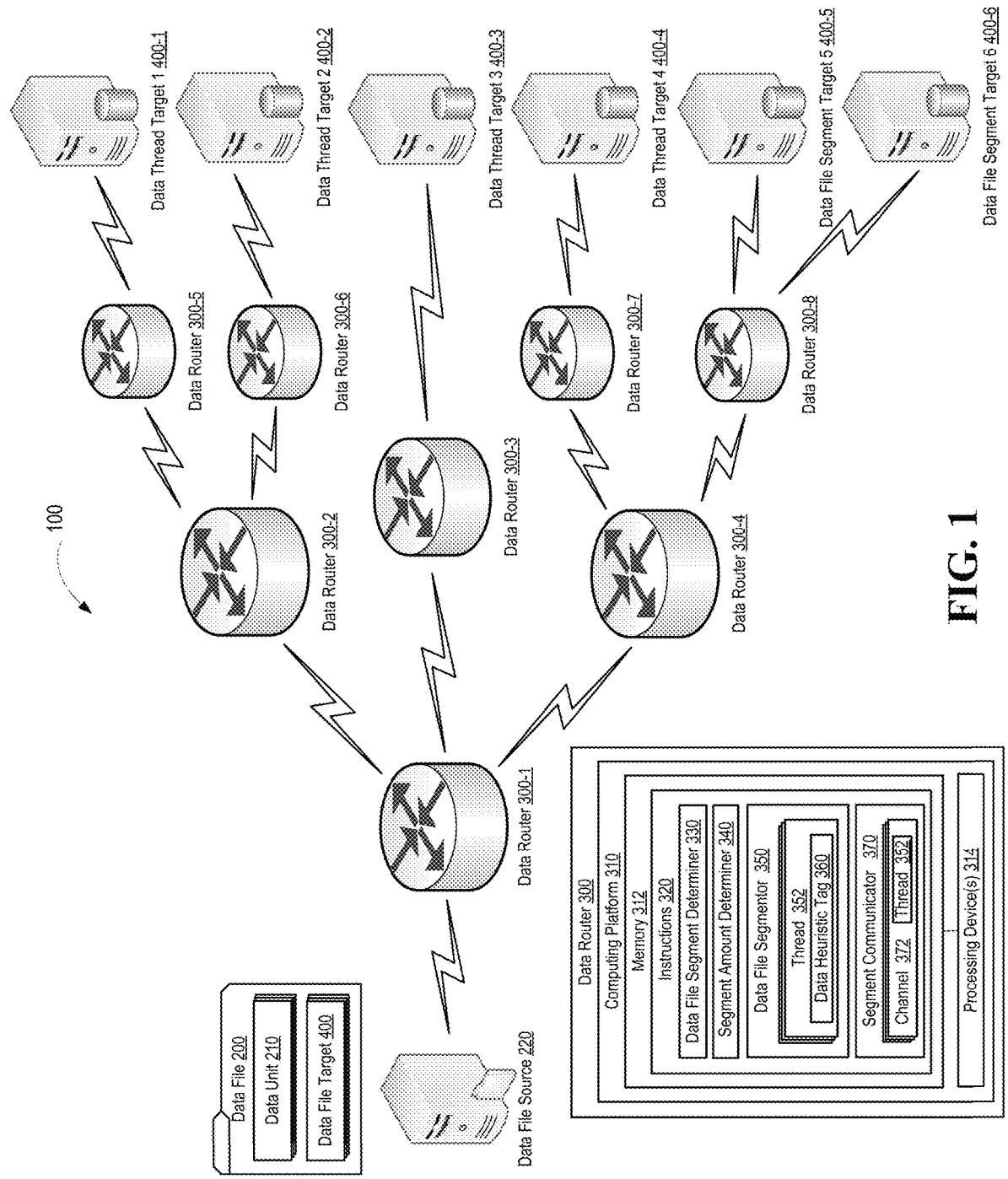
Figure 2:
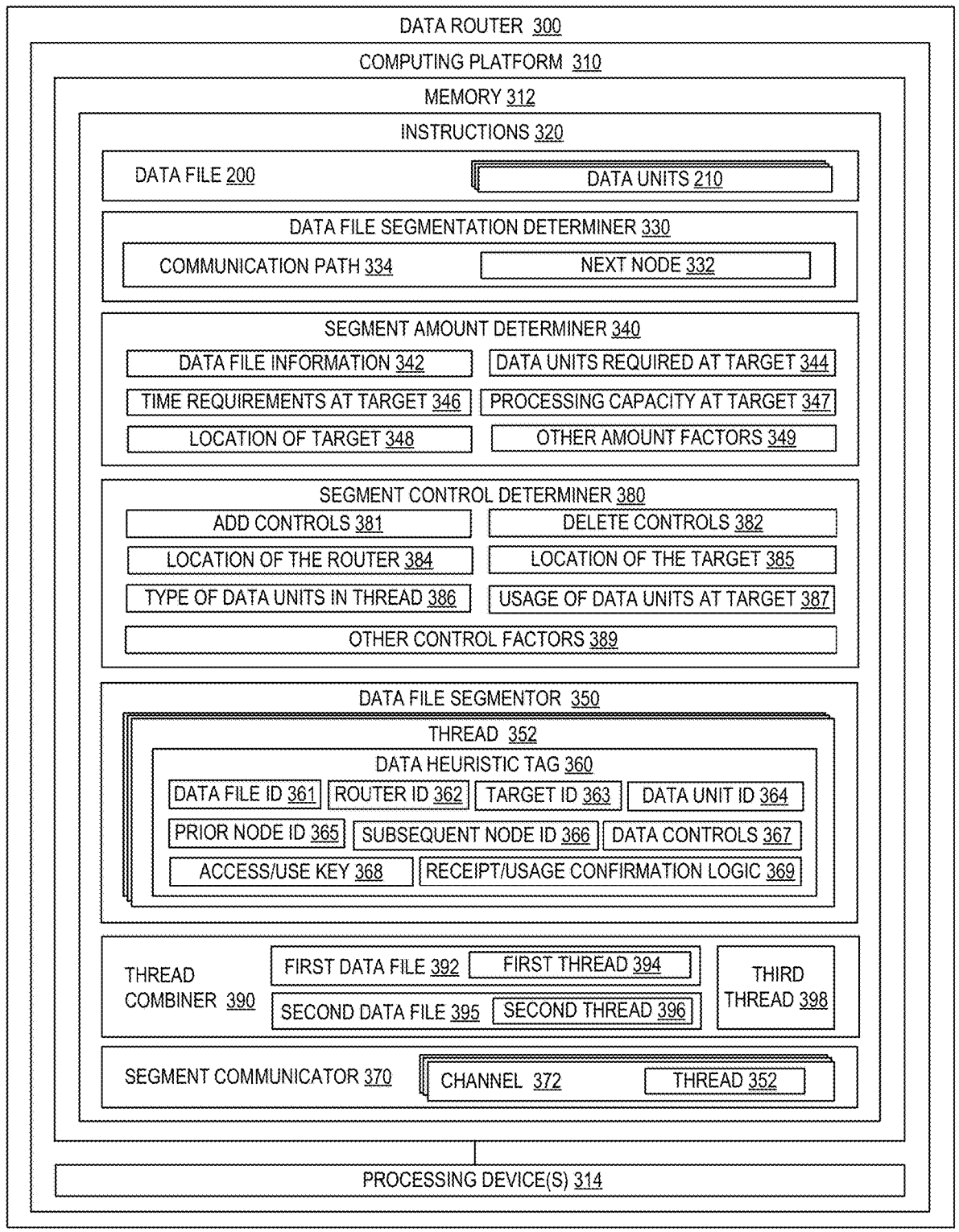
Figure 3:
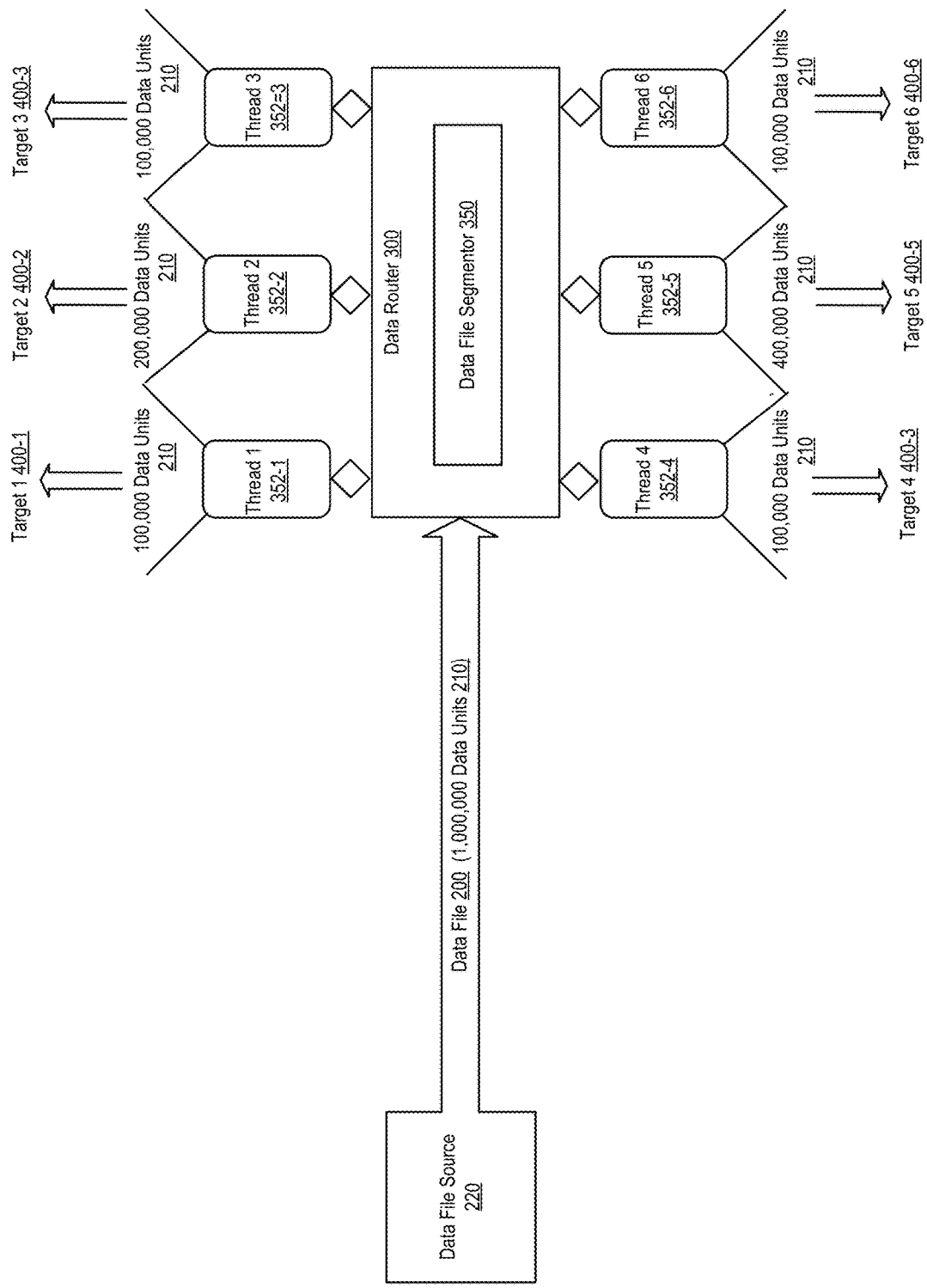
Figure 4:
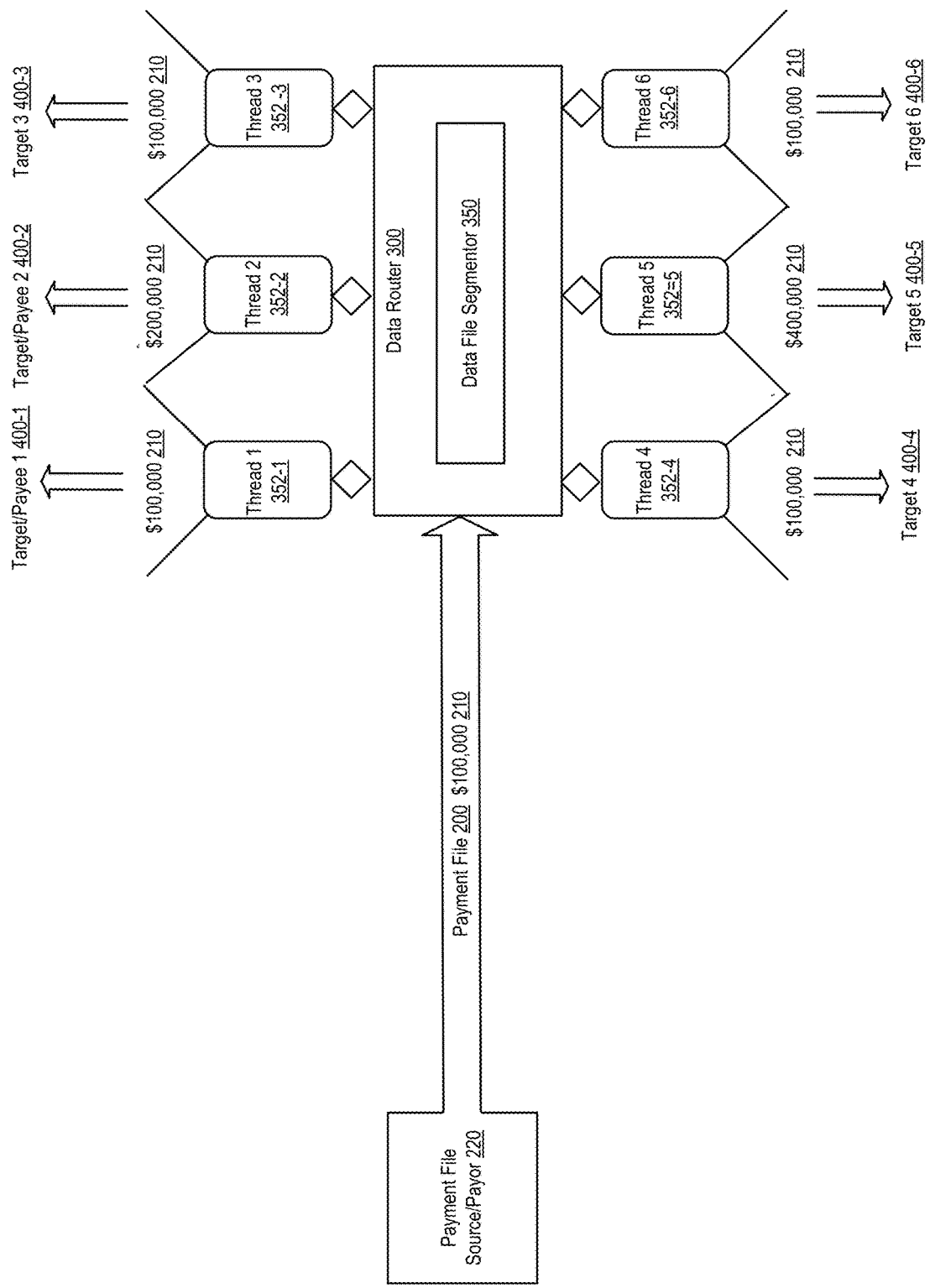
Figure 5:
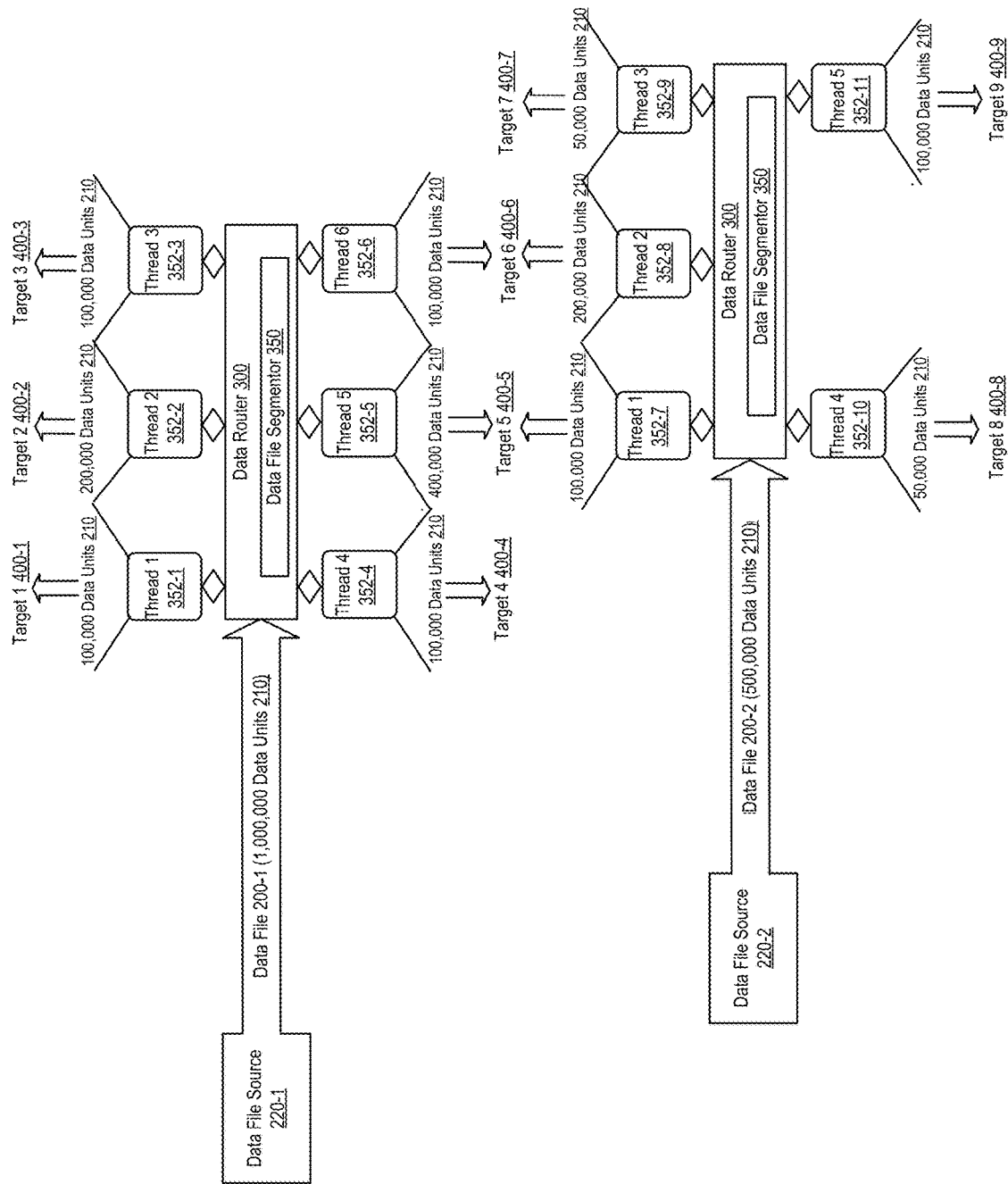
Figure 6:
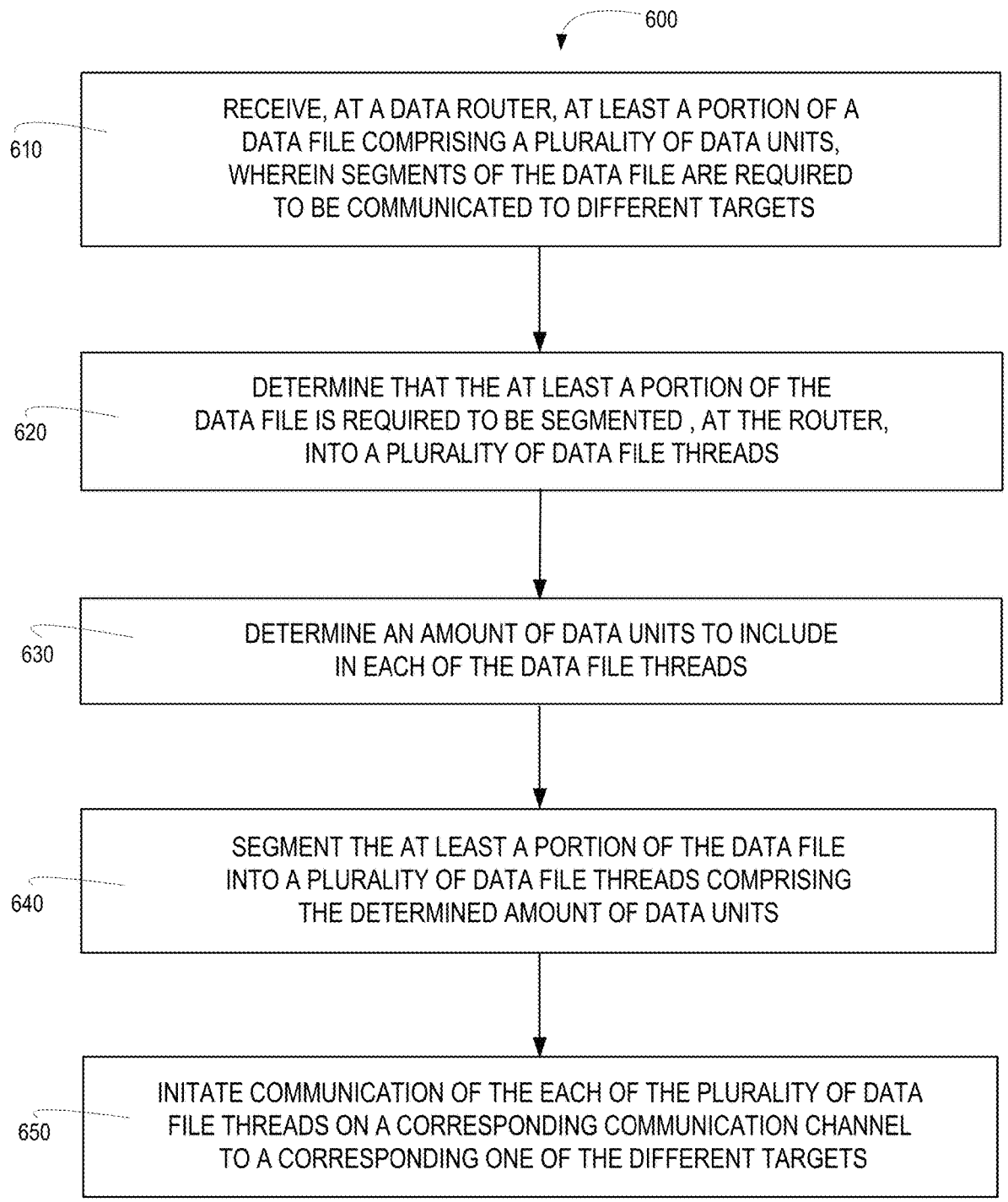

Having thus described embodiments of the disclosure in general terms, reference will now be made to the accompanying drawings, wherein:

FIG. 1 is a schematic/block diagram of a system for multi-distribution of segments of a data file, in accordance with embodiments of the present invention;

FIG. 2 is a block diagram of a data router configured for multi-distribution of segments of a data file, in accordance with embodiments of the present invention;

FIG. 3 is a schematic diagram of a data file segmentation, in accordance with some embodiments of the present disclosure;

FIG. 4 is a schematic diagram of a payment file segmentation, in accordance with embodiment of the present invention;

FIG. 5 is a schematic diagram of two-tiered data file segmentation, in accordance with embodiments of the present invention; and FIG. 6 is flow diagram of a method for multi-distribution of a data file, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that providing for multi-distribution of segments of a data file to different targets. Specifically, embodiments of the invention provide for segmentation of a data file (or portions of a previously segmented data file) during the transmission/routing process of an electronic communication. As a result, a source is able to communicate a data file, segments of which are designated for multiple targets and have the actual segmentation of the data file occur after the data file has been transmitted (i.e., during the routing process). This means that efficiencies and cost-savings can be realized by the source/sender in only having to communicate a single data file. Additionally, in specific embodiments of the invention, Artificial Intelligence (AI) including, in some embodiments, Machine Learning (ML) techniques are implemented at the router-level to provide for smart segmentation decisioning to be made during the routing process, i.e., determining which portions/amounts of the data file should be segmented for each of the multiple targets, which controls should be added or removed from the data file and/or segments and the like.

In specific embodiments of the invention, the data file comprises multiple threads with each thread designated for one of the multiple targets. Each thread includes a data heuristics tag that initially identifies the data file and the desired target. The data heuristics tag is separately communicated to the desired target, such that the tag acts a key providing the target access to the data file segment once the segment has been received by the desired target. Additionally, the data heuristics tag includes logic which allows for identification of each node in the communication path of the data file and/or data file segments, such that data heuristic tag provides the ability to track the lineage (i.e., the routing of the data file and the segment) and the usage (i.e., receipt by the desired target).

Referring to FIG. 1, a schematic diagram is depicted of a system 100 for multi-distribution of segments of a data file, in accordance with embodiments of the present invention. The system is implemented in a distributed communications network (not shown in FIG. 1) which may include the Internet and one or more intranets or the like. The system 100 includes a data file 200 that includes a plurality of data units 210. The data file is configured for segments of the data file, each comprising a portion of the data units 210, to be communicated to different targets 400. In the illustrated example of FIG. 1 the data file is segmented into six different data file threads 352, with each of the data file threads 352 being communicated to a corresponding one of the data targets 400-1-400-6.

The system additionally includes a plurality of data routers 300 that are disposed within the distributed communications network. Each data router 300 includes a computing platform 310 having a memory 312 and one or more processing devices 314. The memory stores instructions 320 which are executable by the processing device(s) 314. In specific embodiments of the invention, instructions 320 are based on Artificial Intelligence (AI) and, in further specific embodiments, implement Machine Learning (ML) techniques to carry out the functionality herein described.

Instructions 320 are configured to configured to receive at least a portion of the data file 200. In certain instances, the data file 200 will have been previously segmented at one or more upstream date routers 300, thus, the data router 200 may receive less than the entire data file 200 (i.e., "at least a portion of").

Instructions 320 include data file segment determiner 330 that is configured to determine that at least a portion of the data file is required to be segmented, at the router, into a plurality of data file threads 352. In specific embodiments of the invention, the determination is based on a next node in the communication path (including the target 400) of the least a portion of the data file being different for at least two of the targets 400. In the illustrated example of FIG. 1, data file segment determiner 330 has determined that segmentation is required at data routers 300-1, 300-2, 300-4 and 300-8.

Instructions 320 further include segment amount determiner 340 that is configured to determine the amount of data units 210 to include in each segment. In specific embodiments of the invention, the amount of data units 210 may be determined based on information in the at least a portion of the data file 200 and/or dynamically determined at the router 300 based, at least on one or more of (i) data units currently required at each of the targets 400, (ii) time requirements for delivering data units to each or the targets 400, (iii) current capacity at each of the targets 400 for processing the data units, and (iv) network or geo-location of each of the targets 400.

Instructions 320 further include data file segmentor 350 that is configured to segment the at least a portion of the data file 200 into the plurality of data file threads 352. Each of the plurality of data file threads 352 include the determined amount of data units 210. Each data file thread 352 includes at least data heuristic tag 360, which may be generated at the router 300 or generated at the data file source 220 and includes at least one identifier configured to identify in the original data file 220. In specific embodiments of the invention, data heuristic tag 360 is configured to identify (i) the data file, (ii) the router at which segmentation occurs, (iii) the target, and (iv) each node in a communication path that the at least a portion of the data file 200 has encountered prior to being received by the data router. In addition, in specific embodiments of the invention, data heuristic tag 360 is logically programmed to generate one or more additional identifiers or add to the existing identifier(s) to identify each subsequent node in the communication path that the data file thread encounters after being received and segmented at the data router 300. In this regard, the data heuristic tag 360 serves to track the lineage of the data file threads 352 from the data file source 220 to the corresponding data file segment target 400. Tracking of the lineage provides a security feature in the event that a portion of the data file thread 352 is not received at the designated target 400.

Additionally, in other specific embodiments of the invention, once generated, the data heuristic tag 360 is transmitted to the target 400 and serves as a key for providing access to the data units 210 contained within the data file thread 352. Further, in other specific embodiments of the invention, the data heuristic tag is logically programmed to track usage/access of the data units 210 and, such usage/access may be communicated back to the data file source 220.

Instructions 320 further include segment communicator 370 that is configured to initiate communication of the data file threads 352 on a corresponding communication channel 372 to a corresponding one of the targets 400.

FIG. 2 depicts a block diagram of a data router 300 configured for multi-distribution of segments of a data file, in accordance with various embodiments of the present invention. The data router 300 includes a computing platform 310, which may comprise one or more computing devices and is configured to execute instructions, such as algorithms, modules, routines, applications and the like. Computing platform 310 includes memory 312 which may comprise volatile and non-volatile memory, such as read-only and/or random-access memory (RAM and ROM), EPROM, EEPROM, flash cards, or any memory common to computing platforms). Moreover, memory 312 and the like may comprise cloud storage, such as provided by a cloud storage service and/or a cloud connection service.

Further, computing platform 310 also includes at least one processing device 314, which may be an application-specific integrated circuit ("ASIC"), or other chipset, logic circuit, or other data processing device. Processing device 314 may execute one or more application programming interface (APIs) (not shown in FIG. 2) that interface with any resident programs, such as instructions 320 or the like stored in the memory 312 of the computing platform 310 and any external programs. Processing device(s) 314 may include various processing subsystems (not shown in FIG. 2) embodied in hardware, firmware, software, and combinations thereof, that enable the functionality of the computing platform 310 and the operability of the computing platform 310 on the distributed communication network. For example, processing subsystems allow for initiating and maintaining communications and exchanging data with other networked devices, such as other data routers, source and targets (shown in FIG. 1). For the disclosed aspects, processing subsystems of data router 300 may include any processing subsystem used in conjunction with instructions 320 and related tools, routines, sub-routines, algorithms, sub-algorithms, sub-modules thereof.

Computing platform 310 may additionally include a communications module (not shown in FIG. 2) embodied in hardware, firmware, software, and combinations thereof, that enables electronic communications between the computing platform 310 and other network devices, such as other network nodes, routers and the like (shown in FIG. 1). Thus, communication module may include the requisite hardware, firmware, software and/or combinations thereof for establishing and maintaining a network communication connection with one or more network devices.

Computing platform 310 includes instructions 320 that are stored in memory 312 and are executable by processing device(s) 314. Instructions 320 are configured to receive to at least a portion of a data file 200 that includes a plurality of data units 210. Segments of the at least a portion of the data file 200 are required to be communicated to different targets 400 (shown in FIG. 1). In specific embodiments of the invention, the data file 200 may comprise a payment file, such that the data units 210 are units of currency. For example, the payment file may originate from one country and has multiple different payee entities/targets within one or more different countries. In such instances, the payor (i.e., source) may incur less international transaction assessments by initiating one international payment that is subsequently segmented into multiple payments within the country(s) of the payee entities/targets.

Instructions 320 include data file segmentation determiner 330 that is configured to determine whether the at least a portion of the data file 200 is required to be segmented, at the router 300, into a plurality of data file threads 352. In specific embodiments of the invention, the at least a portion of a data file 200 includes information that indicates the network or geo-locations of the desired targets 400. For example, the header of the data file may include metadata or the like that indicates the network or geo-locations of the desired targets 400. In other embodiments of the invention, the data file may include data heuristic tags 360 for each of the desired targets that indicate the network or geo-location of the corresponding target 400. In specific embodiments of the invention, the data file is determined to require segmentation at the router based on the next node/router 332 in the communication path 334 being different for at least two of the targets.

Further, instructions 320 include segment amount determiner 340 that is configured to, in response to determining that segmentation is required at the router 300, determine an amount of the data units 210 to include in each of the plurality of data file threads 352. In specific embodiments of the invention, the determination of the amount may be based on data file information 342 (e.g., metadata in the header and/or data heuristic tag 360 data). In other specific embodiments of the invention, the determination of the amount may be dynamically determined at the router based on one or more of (i) data units required at the target 344, (ii) time requirements for receiving the data units at the target 346, (iii) current processing capacity at the target 347, (iv) the network or geo-location of the target and (v) other amount determining factors 349. In such embodiments of the invention, the router 300 or other network node/component may be configured to communicate with the target to determine any one of the aforementioned factors for determining data unit amounts. In specific embodiments of the invention, in which the data file is a payment file, the determination of amount may be based on one or more of (i) amount currently due, (ii) timeliness of payment due, (iii) credit-worthiness of the source/payor, (iv) additional assessments, such as taxes due, and the like.

Further, in specific embodiments of the invention, instructions 320 include segment control determiner 340 that is configured to, in response to determining that segmentation is required at the router 300, determine controls applicable to each of data file threads 352. In this regard, segment control determiner 340 is configured to add controls 381 to a data file thread 352 or delete controls 382 from a data file thread 352 based on one or more of (i) network or geo-location of the router 384, (ii) network or geo-location of the target 385, (iii) type of data units in the data file thread 386, (iv) usage of the data units at the target 387 and (v) other factors 389. The controls may be regulations and the like that dictate how the data file threads 352 are communicated and/or what assessments are placed on the data units 210 within the thread 352. In specific embodiments of the invention, the controls are jurisdictional based on the location of the router 300. For example, if the router is an international router between two different countries, controls associated with the country from which the data file is coming from may be deleted, while controls associated with the country to which the data file and/or threads are being sent may be added. In additional instances the router may be a local router between a country and a state, a state and a city or other municipality or the like and, as such, controls may be added or deleted based on where the data file is coming from and where the data file or data file threads are being sent.

Instructions 320 further include data file segmentor 350 that is configured to segment the at least a portion of the data file 200 into a plurality of data file threads 352, each of the data file threads 352 including the determined amount of data units 210. In specific embodiments of the invention, the data file threads 352 include a data heuristics tag 360 that may be generated at the source 220 (shown in FIG. 1) or generated at the router 300. The data heuristics tag 360 includes at least one identifier, such as, but not limited to (i) a data file identifier 361, (ii) a router identifier 362, (iii) target identifier 363, (iv) data unit identifiers 364 (v) prior node/router identifier(s) 365. In this regard, the data heuristic tag 360 is able to identify the data file 200 from which the thread originated, the router 300 at which the thread was generated, the target 400 for the thread and the nodes/routers that the data file 200 encountered prior to the segmentation/creation of the data file thread 352. In addition, the data heuristic tag 360 is configured to add further subsequent nodes/routers identifiers 366 for each node/router that the data file thread encounters after the thread has been communicated from router 300. In this regard, the data heuristic tag 360 provides a comprehensive means of tracking the lineage/communication path of the data file 200 and each subsequent data file thread 210, Such tracking information is instrumental in the event that the data file 200 or one or more of the data file threads are tampered with (e.g., data units hijacked or the like). In addition, the data heuristics tag 360 may include the data controls 367 that are added/deleted by segment control determiner 380.

Additionally, once generated, data heuristic tag 360 is communicated to the target 400 and, once the data file thread 352 has been received by the target 400, the data heuristic tag 360 serves as the access/use key 368 for the target gaining access to and/or using/consuming the data units 210. In addition, the data heuristic tag 360 includes receipt/usage confirmation logic 369 that is configured to automatically communicate a receipt and/or usage confirmation to the source 220 that indicates that the data file thread 352 has been received by the designated target 400 and the data units 210 in the data file thread 352 have been used/consumed at the target 400. In this regard, the data heuristic tag 360 is configured to track the usage of the data units 210 in the data file thread 352.

Additionally, in specific embodiments of the invention, instructions 320 include thread combiner 390 that is configured to combine data file threads destined for the same target, in accordance with embodiments of the present invention. For example, in the event that a first data file thread 394 that has been segmented from a first data file 392 a second data file thread 396 that has been segmented from a second data file 395 are destined for the same target 400, first and second data file threads 394, 396 may be combined to form third data file thread 398 that includes all of the data units 210 of the first and second data file threads 394, 396. It should be noted that the first and second data files 392 and 395 are not required to be sent from the same source 220 and, thus, may be sent from different sources 220. Moreover, the thread combiner 390 may be configured to delay further communication/transmission of a data file thread, if the thread combiner 390 is aware that a subsequent data file thread that is destined for the same target as the data file thread being delayed is forthcoming. Combining of data file threads limits the volume of data file threads received at one target and, thus, eliminates the need to recombine similar type or usage data units at the target. In example of data file thread recombination is shown and described in relation to FIG. 5, infra.

In addition, instructions 320 further include segment communicator 370 that is configured to initiate communication of the data file threads 352 on a corresponding communication channel 372 to a corresponding one of the targets 400.

Referring to FIG. 3 a schematic diagram is provided of multi-distribution of data file threads to different targets, in accordance with embodiments of the present invention. A data file source 220 initiates communication of a single data file 200 that includes 1,000,000 data units. During the transmission process, data file 200 encounters one or more data routers 300 at which data file segmentor 350 is implemented to segment the data file 200 into a plurality of data file threads 352. It should be noted that the segmentation of the data file 200 into a plurality of data file threads may be performed at one router 300 or, as illustrated in FIG. 1, at a plurality of different routers 300. In the illustrated example of FIG. 3, data file thread 1 352-1 includes 100,000 data units 210 from the data file 200 and is communicated on a data channel to target 1 400-1. Data file thread 2 352-2 includes 200,000 data units 210 from the data file 200 and is communicated on a data channel to target 2 400-2. Data file thread 3 352-3 includes 100,000 data units 210 from the data file 200 and is communicated on a data channel to target 3 400-3. Data file thread 4 352-4 includes 100,000 data units 210 from the data file 200 and is communicated on a data channel to target 4 400-4. Data file thread 5 352-5 includes 400,000 data units 210 from the data file 200 and is communicated on a data channel to target 5 400-5. Data file thread 6 352-6 includes 100,000 data units 210 from the data file 200 and is communicated on a data channel to target 6 400-6.

Referring to FIG. 4 a schematic diagram is provided of multi-distribution of data file threads to different targets, in accordance with embodiments of the present invention. FIG. 4 highlights one embodiment of the invention in which data file 200 is a payment file and the data file units 210 are units of currency (e.g., U.S. dollars). A data file source 220 initiates communication of a single payment file 200 that includes $1,000,000 210. During the transmission process, payment file 200 encounters one or more data routers 300 at which data file segmentor 350 is implemented to segment the data file 200 into a plurality of data file threads 352. In the illustrated example of FIG. 4, payment file thread 1 352-1 includes $100,000 210 from the payment file 200 and is communicated on a data channel to target/payee 1 400-1. Payment file thread 2 352-2 includes $200,000 210 from the payment file 200 and is communicated on a data channel to target/payee 2 400-2. Payment file thread 3 352-3 includes $100,000 210 from the payment file 200 and is communicated on a data channel to target/payee 3 400-3. Payment file thread 4 352-4 includes $100,000 210 from the payment file 200 and is communicated on a data channel to target/payee 4 400-4. Payment file thread 5 352-5 includes $400,000 210 from the payment file 200 and is communicated on a data channel to target/payee 5 400-5. Payment file thread 6 352-6 includes $100,000 data units 210 from the payment file 200 and is communicated on a data channel to target/payee 6 400-6.

Referring to FIG. 5 a schematic diagram is depicted of two-tier multi-distribution of data file threads to different targets in which threads are combined from different data files, in accordance with embodiments of the present invention. In the illustrated embodiment data file source 220-1 initiates communication of a single data file 200-1 that includes 1,000,000 data units. During the transmission process, data file 200 encounters one or more data routers 300 at which data file segmentor 350 is implemented to segment the data file 200-1 into a plurality of data file threads 352 1-6. In the illustrated example of FIG. 5, data file thread 1 352-1 includes 100,000 data units 210 from the data file 200-1 and is communicated on a data channel to target 1 400-1. Data file thread 2 352-2 includes 200,000 data units 210 from the data file 200-1 and is communicated on a data channel to target 2 400-2. Data file thread 3 352-3 includes 100,000 data units 210 from the data file 200-1 and is communicated on a data channel to target 3 400-3. Data file thread 4 352-4 includes 100,000 data units 210 from the data file 200-1 and is communicated on a data channel to target 4 400-4. Data file thread 5 352-5 includes 400,000 data units 210 from the data file 200-1 and is communicated on a data channel to target 5 400-5. Data file thread 6 352-6 includes 100,000 data units 210 from the data file 200-1 and is communicated on a data channel to target 6 400-6.

Further, data file source 220-2 initiates communication of a single data file 200-2 that includes 500,000 data units. During the transmission process, data file 200 encounters one or more data routers 300 at which data file segmentor 350 is implemented to segment the data file 200-1 into a plurality of data file threads 352 7-11. In the illustrated example of FIG. 5, data file thread 1 352-7 includes 100,000 data units 210 from the data file 200-2 and is communicated on a data channel to target 5 400-5. Data file thread 2 352-8 includes 200,000 data units 210 from the data file 200-2 and is communicated on a data channel to target 6 400-6. Data file thread 3 352-9 includes 50,000 data units 210 from the data file 200-2 and is communicated on a data channel to target 7 400-7. Data file thread 4 352-10 includes 50,000 data units 210 from the data file 200-2 and is communicated on a data channel to target 8 400-8. Data file thread 5 352-11 includes 100,000 data units 210 from the data file 200-2 and is communicated on a data channel to target 8 400-8.

Data file thread 5 352-5 of data file 200-1 and data file thread 1 352-7 of data file 200-2 are combined to form a new data file thread (not shown in FIG. 6) including 500,000 data units (400,000 data units from data file thread 5 352-5 and 100,000 data units from data file thread 1 352-7). In addition, data file thread 6 352-6 of data file 200-1 and data file thread 2 352-8 of data file 200-2 are combined to form a new data file thread (not shown in FIG. 6) including 300,000 data units (100,000 data units from data file thread 5 352-5 and 200,000 data units from data file thread 2 352-8). The new data file threads may be formed at any router within the communications network that encounters both of the threads being combined.

Referring to FIG. 6, a flow diagram is presented of a method 600 for multi-distribution of segments of a data file to different targets, in accordance with embodiments of the present invention. At Event 610, at least a portion of a data file that includes a plurality of data units is received at a data router. Segments of the at least a portion of the data file are required to be communicated to different targets 400. In specific embodiments of the method, the data file comprises a payment file, such that the data units are units of currency.

At Event 620, a determination is made that the at least a portion of the data file is required to be segmented, at the router, into a plurality of data file threads. In specific embodiments of the method, the at least a portion of a data file includes information that indicates the network or geo-locations of the desired targets. For example, the header of the data file may include metadata or the like that indicates the network or geo-locations of the desired targets. In other embodiments of the method, the data file may include data heuristic tags for each of the desired targets that indicate the network or geo-location of the corresponding target. In specific embodiments of the invention, the data file is determined to require segmentation at the router based on the next node/router in the communication path being different for at least two of the targets.

In response to determining that segmentation is required at the router, at Event 630, an amount of the data units to include in each of the plurality of data file threads is determined. In specific embodiments of the method, the determination of the amount may be based on data file information (e.g., metadata in the header and/or data heuristic tag data). In other specific embodiments of the invention, the determination of the amount of data units may be dynamically determined at the router based on one or more of (i) data units required at the target, (ii) time requirements for receiving the data units at the target, (iii) current processing capacity at the target, (iv) the network or geo-location of the target, and (v) other amount determining factors. In such embodiments of the method, the router or other network node/component may be configured to communicate with the target to determine any one of the aforementioned factors for determining data unit amounts. In specific embodiments of the method, in which the data file is a payment file, the determination of amount may be based on one or more of (i) amount currently due, (ii) timeliness of payment due, (iii) credit-worthiness of the source/payor, (iv) additional assessments, such as taxes due, and the like.

In response to determining that the amount of data units, at Event 640, the at least a portion of the data file is segmented into a plurality of data file threads, each of the data file threads including the determined amount of data units. In specific embodiments of the invention, the data file threads include a data heuristics tag that may be generated at the source or generated at the router. The data heuristics tag includes at least one identifier, such as, but not limited to, (i) a data file identifier, (ii) a router identifier, (iii) target identifier, (iv) data unit identifiers and/or (v) prior node/router identifier(s). In additional embodiments of the method, the data heuristic tag is configured to add further subsequent nodes/routers identifiers for each node/router that the data file thread encounters after the thread has been communicated from router. In this regard, the data heuristic tag provides a comprehensive means of tracking the lineage/communication path of the data file and each subsequent data file thread. Additionally, the data heuristics tag may include one or more data controls associated with the data file thread.

In response to segmenting the data file into a plurality of data file threads, at Event 650, the data file threads are communication on a corresponding communication channel to a corresponding one of the targets.

Thus, present embodiments of the invention provide for implementing a communication network with multiple data routers capable of segmenting a data file, such that the data routers provide for multi-distribution of different segments of a data file to different targets. As a result, a source is able to communicate a data file, segments of which are designated for multiple targets and have the actual segmentation of the data file occur after the data file has been transmitted (i.e., during the routing process).

The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for multi-distribution of a data file, the system comprising:
   the data file comprising a plurality of data units, wherein the data file is configured for segments of the data file to be communicated to different targets; and
   a plurality of routers disposed with a distributed communication network, wherein each router comprises a computing platform having a memory, at least one processor in communication with the memory, and instructions stored in the memory, wherein the instructions are executable by the least one processor and configured to:
   receive at least a portion of the data file,
   determine that the at least a portion of the data file is required to be segmented, at the router, into a plurality of data file threads;
   determine an amount of the data units to include in each of the plurality of data file threads based at least on one of (i) time requirements for delivering data units to each of the targets, (ii) current capacity of each of the targets for processing the data units, and (iii) network or geo-location of each of the targets,
   generate, for each of the plurality of data file threads, a data heuristics tag that includes (a) at least one identifier configured to identify (i) the data file, (ii) the router, (iii) a target, and (iv) each node in a communication path that the at least a portion of the data file has encountered prior to be received by the router, and (b) logic that is configured to generate one or more additional identifiers to identity each subsequent node in the communication path that the at least a portion of the data file encounters after being received at the router,
   segment the at least a portion of the data file into the plurality of data file threads, each of the plurality of data file threads comprising the determined amount of data units,
   attach the data heuristics tags to corresponding data file threads,
   define a communication channel for each of the plurality of data file threads, and
   initiate communication of each of the plurality of data file threads on the corresponding communication channel to a corresponding one of the different targets.

2. The system of claim 1, wherein the data heuristics tag includes logic that is configured to confirm at least one of receipt of the data file segment at a corresponding target and usage of the data units upon receipt at the corresponding target.

3. The system of claim 1, wherein the instructions are further configured to communicate the data heuristics tag to a target of the data file segment, wherein the target, upon receipt of the data file segment at the corresponding target, uses the data heuristic tag to at least one of (i) access the data units in the data file segment, and (ii) use the data units in the data file segment.

4. The system of claim 1, wherein the instructions are further configured to determine that the at least a portion of the data file is required to be segmented, at the router, into a plurality of data file threads based on a next node in the communication path of the at least a portion of the data file being different for at least two of the targets.

5. The system of claim 1, wherein the instructions are further configured to determine, and apply to each of the data file threads, one or more controls based on one or more of (i) a network or geo-location of the router or target, (ii) type of data units in the data file segment, and (iii) usage of the data units at the target.

6. The system of claim 5, wherein the instructions are further configured to determine, and apply to a data heuristics tag attached each of the data file threads, the one or more controls, wherein the data heuristics tag is configured to identify (i) the data file, (ii) the router, (iii) a target, and (iv) each node in a communication path that the at least a portion of the data file has encountered prior to be received by the router.

7. The system of claim 5, wherein the instructions are further configured to determine, and remove from each of the data file threads, one or more previously applied controls based at least on a difference between (i) the network or geo-location of the router, and (ii) a network or geo-location at which the one or more previously applied controls were applied.

8. A computer-implemented method for multi-distribution of a data file, the method is executed by one or more computing processor devices and comprises:
   receiving, at a router, at least a portion of the data file comprising a plurality of data units, wherein segments of the data file are required to be communicated to different targets;
   determining that the at least a portion of the data file is required to be segmented, at the router, into a plurality of data file threads;
   determining an amount of the data units to include in each of the plurality of data file threads based at least on one of (i) time requirements for delivering data units to each of the targets, (ii) current capacity of each of the targets for processing the data units, and (iii) network or geo-location of each of the targets;
   generating, for each of the plurality of data file threads, a data heuristics tag that includes (a) at least one identifier configured to identify (i) the data file, (ii) the router, (iii) a target, and (iv) each node in a communication path that the at least a portion of the data file has encountered prior to be received by the router, and (b) logic that is configured to generate one or more additional identifiers to identity each subsequent node in the communication path that the at least a portion of the data file encounters after being received at the router;
   segmenting the at least a portion of the data file into the plurality of data file threads, each of the plurality of data file threads comprising the determined amount of data units;
   attaching the data heuristic tags to corresponding data file threads;
   defining a communication channel for each of the plurality of data file threads; and
   initiating communication of each of the plurality of data file threads on the corresponding communication channel to a corresponding one of the different targets.

9. The computer-implemented method of claim 8, wherein generating the data heuristics tag further comprises generating the data heuristics tag including logic that is configured to confirm at least one of receipt of the data file segment at a corresponding target and usage of the data units upon receipt at the corresponding target.

10. The computer-implemented method of claim 8, further comprising: communicating the data heuristics tag to a target of the data file segment, wherein the target, upon receipt of the data file segment at the corresponding target, uses the data heuristic tag to at least one of (i) access the data units in the data file segment, and (ii) use the data units in the data file segment.

11. The computer-implemented method of claim 8, wherein determining that the at least a portion of the data file is required to be segmented, at the router, into the plurality of data file threads further comprises making the determination based on a next node in the communication path of the at least a portion of the data file being different for at least two of the targets.

12. A computer program product comprising:
a non-transitory computer-readable medium that stores a plurality of sets of codes, said plurality of sets of codes when executed by one or more processors of one or more computers cause the one or more computers to perform method steps, said plurality of sets of codes comprising:
a first set of codes for causing at least one of the one or more computers a computer to receive, at a router, at least a portion of a data file comprising a plurality of data units, wherein segments of the data file are required to be communicated to different targets;
a second set of codes for causing at least one of the one or more computers a computer to determine that the at least a portion of the data file is required to be segmented, at the router, into a plurality of data file threads;
a third set of codes for causing at least one of the one or more computers a computer to determine an amount of the data units to include in each of the plurality of data file threads based at least on one of (i) time requirements for delivering data units to each of the targets, (ii) current capacity of each of the targets for processing the data units, and (iii) network or geo-location of each of the targets;
a fourth set of codes for causing at least one of the one or more computers a computer to generate, for each of the plurality of data file threads, a data heuristics tag that includes (a) at least one identifier configured to identify (i) the data file, (ii) the router, (iii) a target, and (iv) each node in a communication path that the at least a portion of the data file has encountered prior to be received by the router, and (b) logic that is configured to generate one or more additional identifiers to identity each subsequent node in the communication path that the at least a portion of the data file encounters after being received at the router;
a fifth set of codes for causing at least one of the one or more computers a computer to segment the at least a portion of the data file into the plurality of data file threads, each of the plurality of data file threads comprising the determined amount of data units;
a sixth set of codes for causing at least one of the one or more computers a computer to attach the data heuristics tag to corresponding data file threads;
a seventh set of codes for causing at least one of the one or more computers a computer to define a communication channel for each of the plurality of data file threads, and
an eighth set of codes for causing at least one of the one or more computers a computer to initiate communication of each of the plurality of data file threads on the corresponding communication channel to a corresponding one of the different targets.

13. The computer program product of claim 12, wherein the second set of codes is further configured to cause the at least one of the one or more computers to determine that the at least a portion of the data file is required to be segmented, at the router, into the plurality of data file threads further comprises making the determination based on a next node in the communication path of the at least a portion of the data file being different for at least two of the targets.

* * * * *